(12) United States Patent
Fernandez Garcia et al.

(10) Patent No.: US 11,514,727 B2
(45) Date of Patent: Nov. 29, 2022

(54) SYSTEM FOR CONDUCTING MAINTENANCE FOR AUTONOMOUS VEHICLES AND RELATED METHODS

(71) Applicant: Continental Automotive Systems, Inc., Auburn Hills, MI (US)

(72) Inventors: Miguel Alejandro Fernandez Garcia, Queretaro (MX); Francisco Javier Gutierrez Martinez, Santa Cruz del Astillero (MX)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 194 days.

(21) Appl. No.: 16/276,913

(22) Filed: Feb. 15, 2019

(65) Prior Publication Data
US 2020/0193725 A1    Jun. 18, 2020

Related U.S. Application Data

(60) Provisional application No. 62/781,415, filed on Dec. 18, 2018.

(51) Int. Cl.
| | |
|---|---|
| *G07C 5/00* | (2006.01) |
| *G06Q 10/00* | (2012.01) |
| *G07C 5/08* | (2006.01) |
| *G06Q 10/10* | (2012.01) |

(52) U.S. Cl.
CPC ......... *G07C 5/006* (2013.01); *G06Q 10/1093* (2013.01); *G06Q 10/20* (2013.01); *G07C 5/008* (2013.01); *G07C 5/085* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 9,791,861 B2 | 10/2017 | Keohane et al. | |
| 9,805,519 B2* | 10/2017 | Ramanujam | G05D 1/0225 |
| 10,065,517 B1* | 9/2018 | Konrardy | B60P 3/12 |
| 10,423,934 B1* | 9/2019 | Zanghi | G05D 1/0225 |
| 10,573,096 B1* | 2/2020 | Harvey | G06Q 40/08 |
| 10,726,644 B2* | 7/2020 | Abari | G06N 5/04 |
| 10,802,486 B1* | 10/2020 | Paul | H04L 67/12 |
| 10,889,196 B2* | 1/2021 | Michels | G08G 1/017 |

(Continued)

FOREIGN PATENT DOCUMENTS

| | | |
|---|---|---|
| CN | 103323696 A | 9/2013 |
| CN | 105469147 A | 4/2016 |

(Continued)

*Primary Examiner* — Todd Melton

(57) ABSTRACT

A method and system for conducting routine maintenance for an autonomous vehicle. The method includes collecting and calculating internal variables of the autonomous vehicle with a processor, evaluating the internal variables of the autonomous vehicle with the processor, and determining if routine maintenance is necessary. External variables are evaluated to determine optimal times for routine maintenance. The vehicle user is informed if routine maintenance is necessary, and a period of time is proposed for performance of the routine maintenance. The vehicle user is requested to confirm that routine maintenance should be attended to at the proposed time.

5 Claims, 2 Drawing Sheets

(56) References Cited

U.S. PATENT DOCUMENTS

| | | |
|---|---|---|
| 2014/0336869 A1 | 11/2014 | Bou-Ghannam et al. |
| 2015/0199854 A1 | 7/2015 | Olsen, III et al. |
| 2016/0133066 A1 | 5/2016 | Lavie |
| 2019/0005464 A1* | 1/2019 | Harris, III .............. G06Q 10/20 |
| 2019/0066398 A1* | 2/2019 | Sankavaram .......... G07C 5/085 |
| 2019/0378350 A1* | 12/2019 | DeRouen ............... G07C 5/008 |

FOREIGN PATENT DOCUMENTS

| | | |
|---|---|---|
| JP | 2002323410 A | 11/2002 |
| KR | 20160073650 A | 6/2016 |

* cited by examiner

SYSTEM FOR CONDUCTING MAINTENANCE FOR AUTONOMOUS VEHICLES AND RELATED METHODS

TECHNICAL BACKGROUND

Autonomous vehicles are vehicles that can autonomously drive themselves without requiring input or direction from the user. A system of sensors detects the location and/or surroundings of the autonomous vehicle in combination with logic within or associated with the autonomous vehicle control the speed, propulsion, braking, and steering of the autonomous vehicle based on the sensor-detected location and surroundings of the autonomous vehicle.

Since the vehicles are autonomous, the vehicle's user may be less aware of the vehicle's status or need for maintenance and fail to timely attend to the maintenance. In addition, as users become less connected with the vehicles, the users may desire to be less responsible for scheduling the vehicle for routine maintenance, and do not want to be inconvenienced with being without the autonomous vehicle when it is needed. Failure to provide routine maintenance or delayed routine maintenance can lead to a shortened life span of the vehicle and/or compromised vehicle performance.

What is needed is an efficient way to schedule and conduct routine maintenance of the autonomous vehicle.

BRIEF SUMMARY

A method and system for conducting routine maintenance for an autonomous vehicle. The method includes collecting and calculating internal variables of the autonomous vehicle with a processor, evaluating the internal variables of the autonomous vehicle with the processor, and determining if routine maintenance is necessary. External variables are evaluated to determine optimal times for routine maintenance. The vehicle user is informed if routine maintenance is necessary, and a period of time is proposed for performance of the routine maintenance. The vehicle user is requested to confirm that routine maintenance should be attended to at the proposed period of time.

In one or more embodiments, a method for conducting routine maintenance of an autonomous vehicle includes collecting and calculating internal variables of the autonomous vehicle with a processor, storing the internal variables of the autonomous vehicle on a memory module, evaluating the internal variables of the autonomous vehicle with the processor, and determining if routine maintenance is necessary with the processor. The method further includes evaluating external variables with the processor to determine optimal times for routine maintenance of the autonomous vehicle if routine maintenance is necessary, informing an autonomous vehicle user if routine maintenance is necessary with a communications module, proposing at least one time period for performance of the routine maintenance to the autonomous vehicle user with the communications module, and requesting confirmation from the autonomous vehicle user with the communications module to attend to routine maintenance.

In one or more embodiments, calculating the internal variables of the autonomous vehicle includes calculating time since last routine maintenance, calculating overall mileage of the autonomous vehicle, and/or evaluating a daily commute of the autonomous vehicle. In one or more embodiments, evaluating the daily commute of the autonomous vehicle includes evaluating the type of traffic experienced by the autonomous vehicle during the daily commute.

In one or more embodiments, the method further includes scheduling the routine maintenance at a dealer if positive confirmation is received from the autonomous vehicle user, and further optionally driving the autonomous vehicle with a navigation system of the autonomous vehicle to the dealer at a scheduled time for routine maintenance of the autonomous vehicle.

In one or more embodiments, the method further includes determining and proposing to the user of the autonomous vehicle with the communications module another time period for performance of the routine maintenance if the user declines the at least one time period.

In one or more embodiments, evaluating external variables with the processor to determine optimal times for routine maintenance includes evaluating traffic conditions near a dealer providing the routine maintenance.

A system for conducting routine maintenance of an autonomous vehicle is described herein. The system includes a memory module containing internal variables of the autonomous vehicle, and a processor communicatively coupled with the memory module. The processor is programmed to collect and calculate internal variables of the autonomous vehicle, evaluate the internal variables of the autonomous vehicle, and determine if routine maintenance of the autonomous vehicle is necessary. The system further includes a communications module communicatively coupled with the processor, where the communications module is programmed to inform an autonomous vehicle user if routine maintenance is necessary and to propose at least one time period for performance of the routine maintenance, and request confirmation from the autonomous vehicle user to attend to routine maintenance.

In one or more embodiments, processor is programmed to calculate the internal variables of the autonomous vehicle by calculating time since last routine maintenance, evaluating a daily commute of the autonomous vehicle, calculating an overall mileage of the autonomous vehicle.

In one or more embodiments, the processor is programmed to determine and propose to the user of the autonomous vehicle with the communications module another time period for performance of the routine maintenance if the user declines the at least one time period.

In one or more embodiments, the system further includes a navigation system communicatively coupled with the processor, the navigation system programmed to drive the autonomous vehicle to the dealer at a scheduled time for routine maintenance.

These and other embodiments, aspects, advantages, and features of the system and method will be set forth in part in the description which follows and will become apparent to those skilled in the art by reference to the following description of the embodiments and referenced drawings or by practice of the embodiments. The aspects, advantages, and features of the embodiments are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

A system and method for planning maintenance for autonomous vehicles is disclosed herein. The method includes collecting and calculating internal variables of the autonomous vehicle with a processor, evaluating the internal variables of the autonomous vehicle with the processor, and determining if routine maintenance is necessary. External variables, including dealer availability, are evaluated to determine optimal times for routine maintenance. The vehicle user is informed if routine maintenance is necessary, and a period of time is proposed for performance of the routine maintenance. The vehicle user is requested to confirm that routine maintenance should be attended to. After determining the optimal time to visit the dealer of routine maintenance, and after the vehicle user has confirmed the routine maintenance, the autonomous vehicle attends the need routine maintenance.

Figure 1:
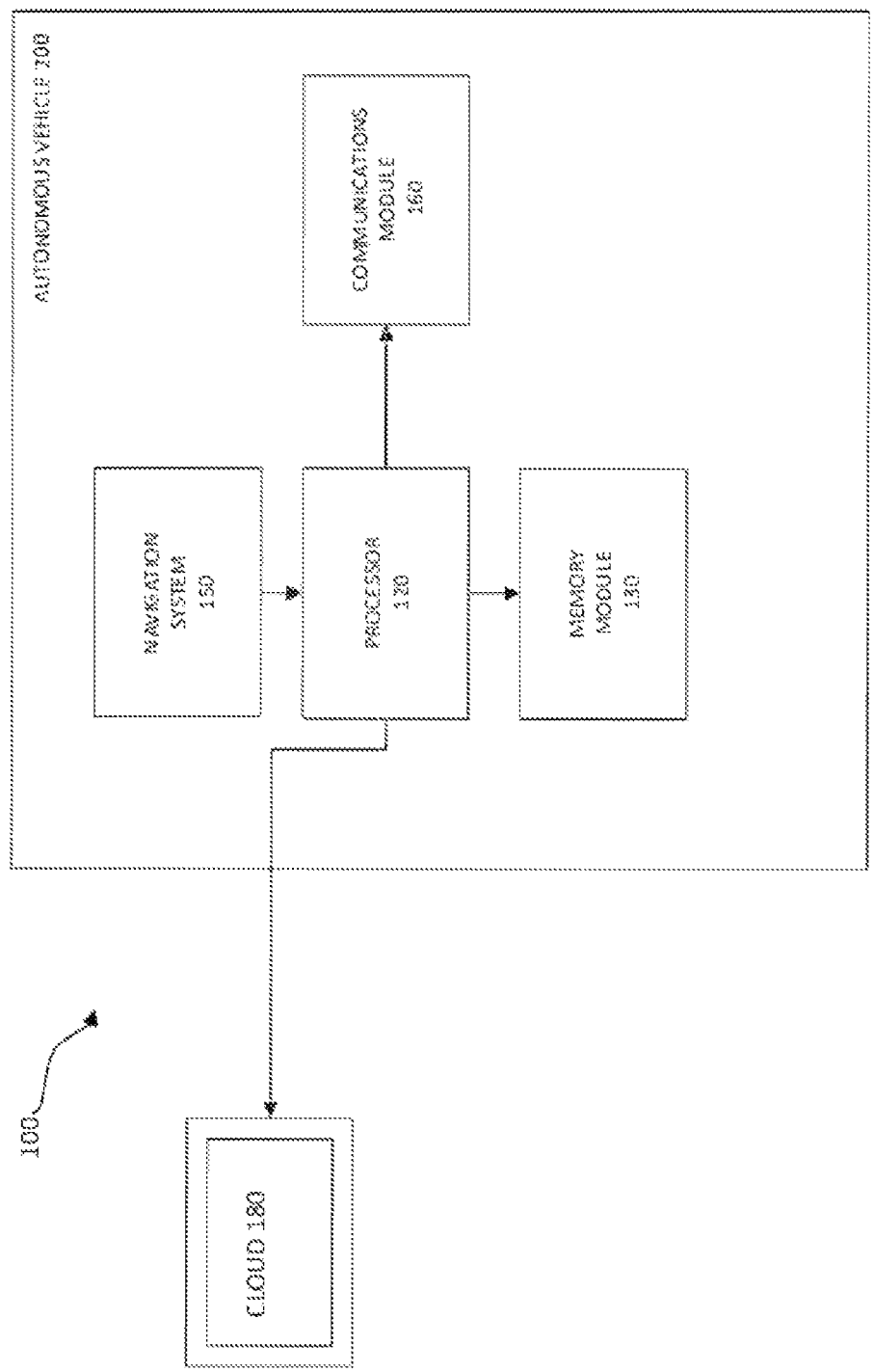
FIG. 1 illustrates a block diagram of a system for conducting maintenance for autonomous vehicles, as constructed in accordance with one or more embodiments.
Figure 2:
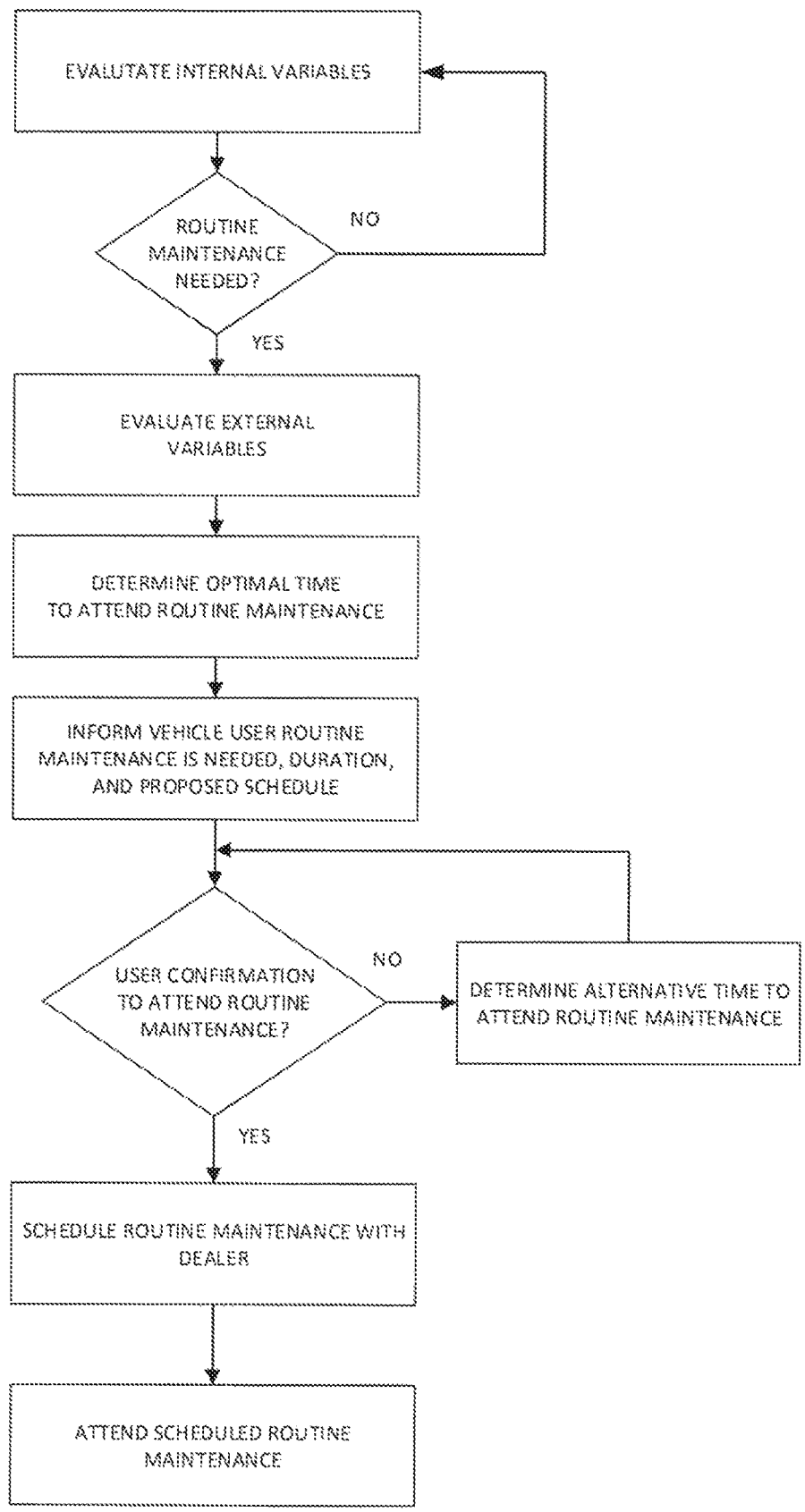
FIG. 2 illustrates a flow chart illustrating a method of use of system for conducting maintenance for autonomous vehicles, as constructed in accordance with one or more embodiments.

The system 100 includes a memory module 130, a processor 120, a communications module 160 that operate within or in conjunction with an autonomous vehicle 200, and as shown in FIGS. 1-2. The processor 120 is in communication with the cloud 180. The system 100 further optionally includes a navigation system 150 allowing for the autonomous vehicle 200 to drive itself, for example to a dealer of routine maintenance.

The memory module 130 is capable of storing internal variables of the autonomous vehicle 200. In addition, a routine vehicle maintenance schedule is pre-stored in the memory module 130, which can be accessed and used by the processor 120 to determine when to schedule the routine maintenance. The memory module 130 further stores the typical inactive hours of use of the autonomous vehicle 200. The memory module 130 can include computer system readable media in the form of volatile memory, such as random access memory (RAM) and/or cache memory. Computer system/server may further include other removable/non-removable, volatile/non-volatile computer system storage media. In one or more embodiments, a storage system can be provided for reading from and writing to a non-removable, non-volatile magnetic media (i.e. a "hard drive"). In one or more embodiments, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. The memory module 130 can include at least one program product having one or more program modules that are programmed to carry out the functions of various embodiments.

The processor 120 collects and calculates internal variables of the autonomous vehicle 200 and is communicatively coupled with the memory module 130. The internal variables are variables related to the car and are used to determine when to attend to the routine maintenance. In one or more embodiments, the internal variables include a daily commute, time since last maintenance, and mileage of the autonomous vehicle 200. The daily commute is a structure of data including one or more of average commuting time, distance of the commute, routes of the commute, start and end time of the commute. In one or more embodiments, the daily commute further includes information regarding traffic levels experienced by the autonomous vehicle 200 during the commute. For example, it is noted when traffic is heavy, which can shorten the time necessary for routine maintenance of the autonomous vehicle 200. The time since last maintenance is the time that has elapsed from the last date of maintenance to the current date. The mileage relates to the drive miles of the autonomous vehicle 200.

The processor 120 is programmed to collect and calculate internal variables of the autonomous vehicle 200, evaluate the internal variables of the autonomous vehicle, and determine if routine maintenance of the autonomous vehicle 200 is necessary. The processor 120 accesses the memory module 130 to gain information on the internal variables, the inactive time periods of the autonomous vehicle 200, and the routine vehicle maintenance schedule. The processor 120 further works with the cloud 180 to acquire information and services needed for the routine maintenance and to obtain information regarding services needed for the routine maintenance. For example, the processor 120 works with the cloud to determine the routine maintenance dealer's schedule and availability, approximate duration of service, and the existence of a "Recall" for the vehicle (i.e. is there a safety-related repair to be done). The processor 120 further considers external variables when determining optimal times for routine maintenance including, but not limited to, traffic conditions near the routine maintenance dealer. The processor 120 develops optimal times of routine maintenance of the autonomous vehicle if routine maintenance is necessary and works with the communications module 160 to inform the user is routine maintenance is necessary, and proposes at least one time period for performance of the routine maintenance. Working with the communications module 130, a confirmation is requested from the autonomous vehicle user to attend to the routine maintenance. Once confirmation from the user is received, the processor schedules the routine maintenance at the routine maintenance dealer. The cost of the maintenance is charged to a pre-registered user credit/debit card.

In one or embodiments, in considering external variables, the processor 120 receives equipment sensor readings from equipment at the routine maintenance dealer. In response to determining, based on the equipment sensor readings, that the equipment at the service facility is currently unable to provide the maintenance service, the processor 120 locate a secondary routine maintenance dealer for providing the routine maintenance, and direct the autonomous vehicle to autonomously drive to the secondary routine maintenance dealer during the time window in which the user of the autonomous vehicle will not need the autonomous vehicle.

In one or more embodiments, the processor 120 receives a notice from the routine maintenance dealer indicating that an amount of time required to perform the maintenance service will extend beyond the time window in which the user of the autonomous vehicle will not need the autonomous vehicle. That is, if a scheduling computer at the routine maintenance dealer determines that the autonomous vehicle 200 will not be ready before the user needs it to drive itself back to the user, then communications module 160 will issue a message to the user notifying of the delay.

In an embodiment of the system and method, the processor 120 receive roadway sensor readings from roadway sensors on the roadway to the service facility, where the roadway sensor readings describe a physical state of the roadway to the service facility. The processor 120 then adjust the amount of time required for the autonomous vehicle to travel to the service facility based on the physical state of the roadway to the service facility.

In one or more embodiments, the processor 120 receives weather sensor readings, where the weather sensor readings describe a state of weather at the service facility. The processor 120 can adjust the amount of time required for the autonomous vehicle to travel to the service facility based on the state of the weather at the service facility.

As mentioned above, the processor 120 works with the communications module 160 to inform an autonomous vehicle user if routine maintenance is necessary and to propose at least one time period for performance of the routine maintenance, and request confirmation from the autonomous vehicle user to attend to routine maintenance.

In one or more embodiments, the system 100 and method are implemented in a cloud environment. Implementation of the embodiments recited herein are not limited to a cloud computing environment. Rather, embodiments of the system and method are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include various characteristics, service models, and/or deployment models.

Characteristics include, but are not limited to on-demand self-service, broad network access, resource pooling, rapid elasticity, and/or measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models include Software as a Service (SaaS), Platform as a Service (PaaS), Infrastructure as a Service (IaaS). Deployment Models include one or more of a private cloud, community cloud, public cloud, or a hybrid cloud. A cloud computing environment is service oriented with a focus on statelessness, low coupling, modularity, and semantic interoperability. At the heart of cloud computing is an infrastructure comprising a network of interconnected nodes.

As discussed above, the processor 120, in combination with the communications module 160, proposes optimal time periods for routine maintenance, and after receiving confirmation from the user of the autonomous vehicle, schedules maintenance with the routine maintenance dealer. When the appointment occurs, the autonomous vehicle 200 is directed to self-drive to the routine maintenance dealer, where the autonomous vehicle 200 is capable of traveling autonomously towards a routine maintenance dealer along a roadway using the navigation system 150. The roadway may be a public roadway, a private roadway, a parking lot, a paved road, an unpaved road, and/or any other surface capable of supporting vehicles, which may be wheeled (e.g., cars), tracked (e.g., trains), or a combination thereof. The roadway can include roadway sensors, which include mechanical, visual, and/or electrical sensors that are able to detect a variety of factors including the number and speed of vehicles traveling on the roadway, the amount and/or type of precipitation on the roadway, the temperature of the roadway and/or ambient air around the roadway, the movement of vehicles traveling along roadway.

While in autonomous mode, autonomous vehicle 200 operates without the input of a human driver, such that the engine, steering mechanism, braking system, horn, signals, etc. are controlled by the navigation system 150. The autonomous vehicle takes inputs from navigation and control sensors and roadway sensors to navigate the autonomous vehicle 200.

Navigation and control sensors further include hardware sensors that determine the location of the autonomous vehicle 200, sense other cars and/or obstacles and/or physical structures around autonomous vehicle 200, measure the speed and direction of the autonomous vehicle 200; and provide any other inputs needed to safely control the movement of the autonomous vehicle 200.

As described herein, a method is directed to autonomously driving an autonomous vehicle to a service facility based on needs of the autonomous vehicle calculated and evaluated using internal variables, capabilities of the routine maintenance dealer using external variables, schedule of the user/owner of the autonomous vehicle, and the permission and/or confirmation of the user/owner.

Referring to FIG. 2, the method includes a method and system for conducting routine maintenance for an autonomous vehicle. The method includes collecting and calculating internal variables of the autonomous vehicle with a processor, evaluating the internal variables of the autonomous vehicle with the processor, and determining if routine maintenance is necessary. External variables are evaluated to determine optimal times for routine maintenance. The vehicle user is informed if routine maintenance is necessary, and a period of time is proposed for performance of the routine maintenance. The vehicle user is requested to confirm that routine maintenance should be attended to.

In one or more embodiments, a method for conducting routine maintenance of an autonomous vehicle includes collecting and calculating internal variables of the autonomous vehicle with a processor, storing the internal variables of the autonomous vehicle on a memory module, evaluating the internal variables of the autonomous vehicle with the processor, and determining if routine maintenance is necessary with the processor. The method further includes evaluating external variables with the processor to determine optimal times for routine maintenance of the autonomous vehicle if routine maintenance is necessary, informing an autonomous vehicle user if routine maintenance is necessary with a communications module, proposing at least one time period for performance of the routine maintenance to the autonomous vehicle user with the communications module, and requesting confirmation from the autonomous vehicle user with the communications module to attend to routine maintenance.

In one or more embodiments, calculating the internal variables of the autonomous vehicle includes calculating time since last routine maintenance, calculating overall mileage of the autonomous vehicle, and/or evaluating a daily commute of the autonomous vehicle. In one or more embodiments, evaluating the daily commute of the autonomous vehicle includes evaluating the type of traffic experienced by the autonomous vehicle during the daily commute.

In one or more embodiments, the method further includes scheduling the routine maintenance at a dealer if positive confirmation is received from the autonomous vehicle user, and further optionally driving the autonomous vehicle with a navigation system of the autonomous vehicle to the dealer at a scheduled time for routine maintenance of the autonomous vehicle.

In one or more embodiments, the method further includes determining and proposing to the user of the autonomous vehicle with the communications module another time period for performance of the routine maintenance if the user declines the at least one time period.

In one or more embodiments, evaluating external variables with the processor to determine optimal times for routine maintenance includes evaluating traffic conditions near a dealer providing the routine maintenance.

The processor 120 can identify a routine maintenance dealer that is capable of providing the routine maintenance. The identification of the service facility may be based on a lookup table of authorized service facilities for autonomous vehicle 200, information from a website for routine maintenance dealer, a preferred service facility named by the owner/operator of the autonomous vehicle 200, a dealership from which the autonomous vehicle 200 was purchased, etc. or information available via the could 180.

The processor 120 determine an amount of time required for the autonomous vehicle to travel to and from a current location of the autonomous vehicle to the service facility and to receive the routine maintenance, particularly at certain times of the day, day of the week, month of the year, etc., and can be determined based on the distance between the current location of autonomous vehicle 200 to routine maintenance dealer, road conditions, speed limits, traffic conditions, etc. expected when traveling to routine maintenance dealer, etc. The amount of time required by the routine maintenance dealer to provide the maintenance may be provided from a lookup table of typical service lengths, the current backlog of work (from a scheduling computer at routine maintenance dealer), the condition of equipment and/or parts needed at routine maintenance dealer to perform the service deemed necessary by the autonomous vehicle equipment maintenance sensor and the autonomous vehicle on-board computer, etc.

The processor 120 further identifies a time window in which a user of the autonomous vehicle will not need the autonomous vehicle. This information may be determined based on a history of the user. For example, if the user is at work from Monday through Friday between 9:00 and 5:00, and typically does not use the autonomous vehicle during these times, then this is the time window in which this user of the autonomous vehicle will likely not need the autonomous vehicle. Alternatively, the user may simply input this time window into the autonomous vehicle on-board computer or other system. Thereafter, the amount of time required for the autonomous vehicle to travel to and from the service facility and to receive the maintenance service is matched to an amount of time in the time window in which the user of the autonomous vehicle will not need the autonomous vehicle. The processor 120, in combination with the communications module 160, will propose at least one time period for performance of the routine maintenance the autonomous vehicle user, and will request confirmation from the vehicle user.

Once confirmation is received from the vehicle user, the processor 120 direct the navigation system 150 of the autonomous vehicle 200 to autonomously drive the autonomous vehicle 200 to the routine maintenance dealer during the proposed time window.

In an example of use, an autonomous vehicle is used by a family of four. The autonomous vehicle leaves at 7 a.m. to take the children to school, comes back home at 7:30 a.m. and leaves at 7:45 a.m. to take one of the parents to their work place, and returns home. Later at 9 a.m. it takes the other parent to their work place. In the afternoon, the autonomous vehicle picks up the children from school at 3 p.m. and takes them home. Afterwards, it picks up one parent at 5 p.m. and returns home. Later it picks up the other parent and returns home at 7 p.m. The scenario takes place every week day, with slight variations.

The system 100 registered the inactive hours in a day, and stores in the memory module 130. The system continuously monitors the last date of maintenance and the mileage, and compares this to the routine car maintenance schedule. As the date of maintenance gets closer, the system 100 begins to verify traffic at the inactive hours, dealer's schedule availability, and approximate duration of service. The system 100 calculates an optimal time to visit the dealer, and the user is asked to acknowledge the decision. Once the proposed time is confirmed by the user, the system 100 schedules an appointment with the routine maintenance dealer, and at the proposed time drives the vehicle to the dealer.

The terminology used herein is for the purpose of describing particular embodiments only and is not intended to be limiting of the system and method. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Advantageously, the system and methods described herein take into account the routes traveled and the various environments in which the autonomous vehicle operates to calculate the necessary routine maintenance needed. The system and method take into account both external and internal variables, as well as confirmation from the user/owner. By asking for confirmation from the autonomous vehicle user, the user has control over when the routine maintenance occurs.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A method for conducting maintenance of an autonomous vehicle, the method comprising:
   determining if maintenance of the autonomous vehicle is necessary based on a period of time since a last maintenance of the autonomous vehicle and a mileage of the autonomous vehicle;
   determining an optimal time for the maintenance of the autonomous vehicle;
   informing an autonomous vehicle user of the optimal time for the maintenance of the autonomous vehicle;
   receiving confirmation of the optimal time for the maintenance of the autonomous vehicle from the autonomous vehicle user; and
   autonomously driving the autonomous vehicle to a location of the maintenance of the autonomous vehicle based on the optimal time for the maintenance of the autonomous vehicle,
   wherein determining the optimal time for the maintenance of the autonomous vehicle comprises evaluating a daily commute of the autonomous vehicle user,
   wherein evaluating the daily commute of the autonomous vehicle user comprises evaluating a type of traffic experienced by the autonomous vehicle during the daily commute, and
   wherein determining the optimal time for the maintenance of the autonomous vehicle comprises evaluating traffic conditions near the location of the maintenance.

2. The method as recited in claim 1, further comprising scheduling the maintenance of the autonomous vehicle at the location of the maintenance of the autonomous vehicle.

3. The method as recited in claim 1, wherein the optimal time comprises a plurality of times for the maintenance of the autonomous vehicle.

4. A system for conducting maintenance of an autonomous vehicle, the system comprising:
   a memory module storing software for controlling the autonomous vehicle to perform a method for conducting the maintenance of the autonomous vehicle; and
   a processor communicatively coupled with the memory module, the processor executing the software programmed to control the autonomous vehicle to conduct the maintenance of the autonomous vehicle,
   wherein the method for conducting the maintenance of the autonomous vehicle comprises:
      determining if the maintenance of the autonomous vehicle is necessary based on a period of time since a last maintenance of the autonomous vehicle and a mileage of the autonomous vehicle;
      determining an optimal time for the maintenance of the autonomous vehicle; and
      informing an autonomous vehicle user of the optimal time for the maintenance of the autonomous vehicle;
      receiving confirmation of the optimal time for the maintenance of the autonomous vehicle from the autonomous vehicle user; and
      autonomously driving the autonomous vehicle to a location of the maintenance of the autonomous vehicle based on the optimal time for the maintenance of the autonomous vehicle,
   wherein determining the optimal time for the maintenance of the autonomous vehicle comprises evaluating a daily commute of the autonomous vehicle user,
   wherein evaluating the daily commute of the autonomous vehicle user comprises evaluating a type of traffic experienced by the autonomous vehicle during the daily commute, and
   wherein determining the optimal time for the maintenance of the autonomous vehicle comprises evaluating traffic conditions near the location of the maintenance.

5. The system for conducting routine maintenance of an autonomous vehicle as recited in claim 4, wherein the optimal time comprises a plurality of times for the maintenance of the autonomous vehicle.

\* \* \* \* \*